United States Patent
Choudhari et al.

(10) Patent No.: US 12,423,065 B2
(45) Date of Patent: Sep. 23, 2025

(54) AUTOMATICALLY GENERATING CODE USING A CODEBASE-SPECIFIC STRUCTURE CONFIGURATION

(71) Applicant: Microsoft Technology Licensing, LLC, Redmond, WA (US)

(72) Inventors: Ankit Krishan Choudhari, Bothell, WA (US); Daniel Suarez Garcia, Alpharetta, GA (US); Dina So, Monroe, WA (US); Dharamvirsinh Natavarsinh Mahida, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 217 days.

(21) Appl. No.: 18/454,733

(22) Filed: Aug. 23, 2023

(65) Prior Publication Data
US 2025/0068401 A1    Feb. 27, 2025

(51) Int. Cl.
| | | |
|---|---|---|
| *G06F 8/38* | (2018.01) | |
| *G06F 8/34* | (2018.01) | |
| *G06F 8/71* | (2018.01) | |
| *G06F 9/54* | (2006.01) | |
| *G06F 16/26* | (2019.01) | |
| *G06N 3/045* | (2023.01) | |
| *G06Q 50/00* | (2012.01) | |
| *G10L 15/18* | (2013.01) | |

(52) U.S. Cl.
CPC .................. *G06F 8/34* (2013.01); *G06F 8/38* (2013.01); *G06F 8/71* (2013.01); *G06F 9/54* (2013.01); *G06F 16/26* (2019.01); *G06N 3/045* (2023.01); *G06Q 50/01* (2013.01); *G10L 15/1822* (2013.01)

(58) Field of Classification Search
CPC .......... G06N 3/045; G06F 8/38; G06F 16/26; G06F 8/34; G10L 15/1822; G06Q 50/01
See application file for complete search history.

(56) References Cited

U.S. PATENT DOCUMENTS

| | | |
|---|---|---|
| 9,886,168 B2 | 2/2018 | Sahasrabudhe et al. |
| 9,984,105 B2 | 5/2018 | Freed et al. |
| 10,169,220 B2 | 1/2019 | Rajagopalan et al. |
| 2011/0307252 A1* | 12/2011 | Ju ........................ G10L 15/1822 704/E15.014 |
| 2018/0307464 A1 | 10/2018 | Bijani et al. |
| 2018/0330017 A1* | 11/2018 | Kelly ........................ G06F 8/38 |

(Continued)

OTHER PUBLICATIONS

International Search Report and Written Opinion received for PCT Application No. PCT/US2024/038439, Nov. 7, 2024, 14 pages.

*Primary Examiner* — Tuan A Vu
(74) *Attorney, Agent, or Firm* — Ray Quinney & Nebeker P.C.; James S. Bullough (57) ABSTRACT

Code examples of the codebase are obtained, and a structure configuration is generated using the obtained code examples and a standard configuration dataset, and includes code components specific to the codebase. Labels that are indicative of component attributes are assigned to the code components of the structure configuration. A code generation request is received, and the request is converted into a plurality of feature-prompts. At least one code component is mapped to each feature prompt based on semantic similarity of the feature prompt to a label of the mapped code component. Application code is generated using the mapped code components.

20 Claims, 6 Drawing Sheets

(56) References Cited

U.S. PATENT DOCUMENTS

2021/0042662 A1\* 2/2021 Pu .......................... G06Q 50/01
2021/0157554 A1 5/2021 Minasyan
2024/0354641 A1\* 10/2024 Miller .................... G06N 3/045

\* cited by examiner

AUTOMATICALLY GENERATING CODE USING A CODEBASE-SPECIFIC STRUCTURE CONFIGURATION

BACKGROUND

Generating modern software products requires consideration of feature requirements as well as compliance with company rules and standards. These many requirements complicate the development process and require input from various designers and managers. Efficiently generating software products while ensuring that they comply with company standards, append the correct messages, and/or honor theming presents significant challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for generating a structure configuration from a codebase and generating application code using the structure configuration is described. Code examples of the codebase are obtained, the code examples including user interface (UI) component examples and application programming interface (API) usage examples, and a structure configuration associated with the codebase is generated using the obtained code examples and a standard configuration dataset. The structure configuration includes code components specific to the UI component examples and the API usage examples. Labels are assigned to the code components of the structure configuration that are indicative of component attributes. A code generation request is received, and the code generation request is converted into a plurality of feature prompts. At least one UI code component and/or API code component in the structure configuration is mapped to each feature prompt based on semantic similarity of the feature prompt to an assigned label of the mapped code component. Application code is generated using each of the mapped code components, wherein the application code includes code for displaying a UI code component from the structure configuration and code for calling an API of an API code component from the structure configuration. The generated application code is deployed for execution.

BRIEF DESCRIPTION OF THE DRAWINGS

The present description will be better understood from the following detailed description read considering the accompanying drawings, wherein:

Corresponding reference characters indicate corresponding parts throughout the drawings. In FIGS. 1 to 6, the systems are illustrated as schematic drawings. The drawings may not be to scale. Any of the figures may be combined into a single example or embodiment.

DETAILED DESCRIPTION

Aspects of the disclosure provide a platform for analyzing a codebase and storing commonly used code components and associated patterns in a structure configuration data structure. The structure configuration is then used to automatically generate code in the form of multiple interlocking code components, wherein the generated code components are retrieved from and/or derived from code components stored in the structure configuration. The automatic generation of code is prompted by a code generation request, which can include plain language from a user, design specification or requirement information, or the like. In some embodiments of the disclosure, code examples are obtained from the codebase, including various types of code components and/or APIs associated therewith. Further, the code examples include information and/or patterns (e.g., business information and/or security code patterns) that are standard in the codebase. The structure configuration of the codebase is generated by traversing the code examples and recording the code of the code examples into the structure configuration. Further, relationships between code components in the code examples are recorded in a tree structure, such that code components that are included in or otherwise used by other, more complex code components can be readily generated as part of generating those more complex code components later. After the structure configuration is generated, a code generation request is received, and the code generation request is converted into a plurality of feature prompts using a multi-modal machine learning (ML) model. In some such examples, the multi-modal model is fine-tuned using the structure configuration, enabling it to generate feature prompts that specifically map to code components within the structure configuration. Application code is generated in response to the code generation request using the plurality of feature prompts and the structure configuration, such that the generated code components conform to common patterns and techniques of the codebase automatically.

The disclosure operates in an unconventional manner at least by analyzing the code examples of the codebase to capture major code component and associated APIs as well as any business compliance elements or patterns thereof. The process performed by the discovery engine generates the structure configuration which is specific to the needs and requirements of the codebase, such that code generated using the structure configuration is automatically written to include the major code components, associated APIs, and any associated business compliance elements. This aspect of the disclosure reduces the resource costs (e.g., processing resources, data storage resources, etc.) associated with implementing the generated code and confirming that the code complies with any business requirements.

Further, the structure configuration is defined and populated in an efficient structure, such that the code generation process performed by the build engine is improved and/or optimized. The code of code components is stored within the structure configuration and the relationships between code components are also maintained (e.g., a code component is made up of other code components and/or makes calls to other code components via APIs). Using this structure, the build engine is enabled to efficiently generate complex code components and any associated code components, resulting in code that is generated using optimized processing resources. Further, the resulting generated code is efficiently written according to codebase patterns, such that the generated code is efficient with respect to occupied storage space, is user-friendly to review, and is executable immediately upon generation.

Additionally, in some examples, the disclosure uses an ML model to generate feature prompts that are then used by the build engine to generate the requested code. The ML model is fine-tuned to the structure configuration of the codebase, such that the feature prompts generated by the ML model are semantically accurate with respect to any requested features and can be quickly and efficiently translated into one or more code components to be generated by the build engine. The accurate determination of code components to be generated is of paramount importance to the effectiveness of the disclosure and, by using a fine-tuned ML model, the accuracy of the generated code with respect to any requested features is improved, thus reducing the time and resource costs associated with modifying or rewriting generated code to cure any identified inaccuracies.

Figure 1:
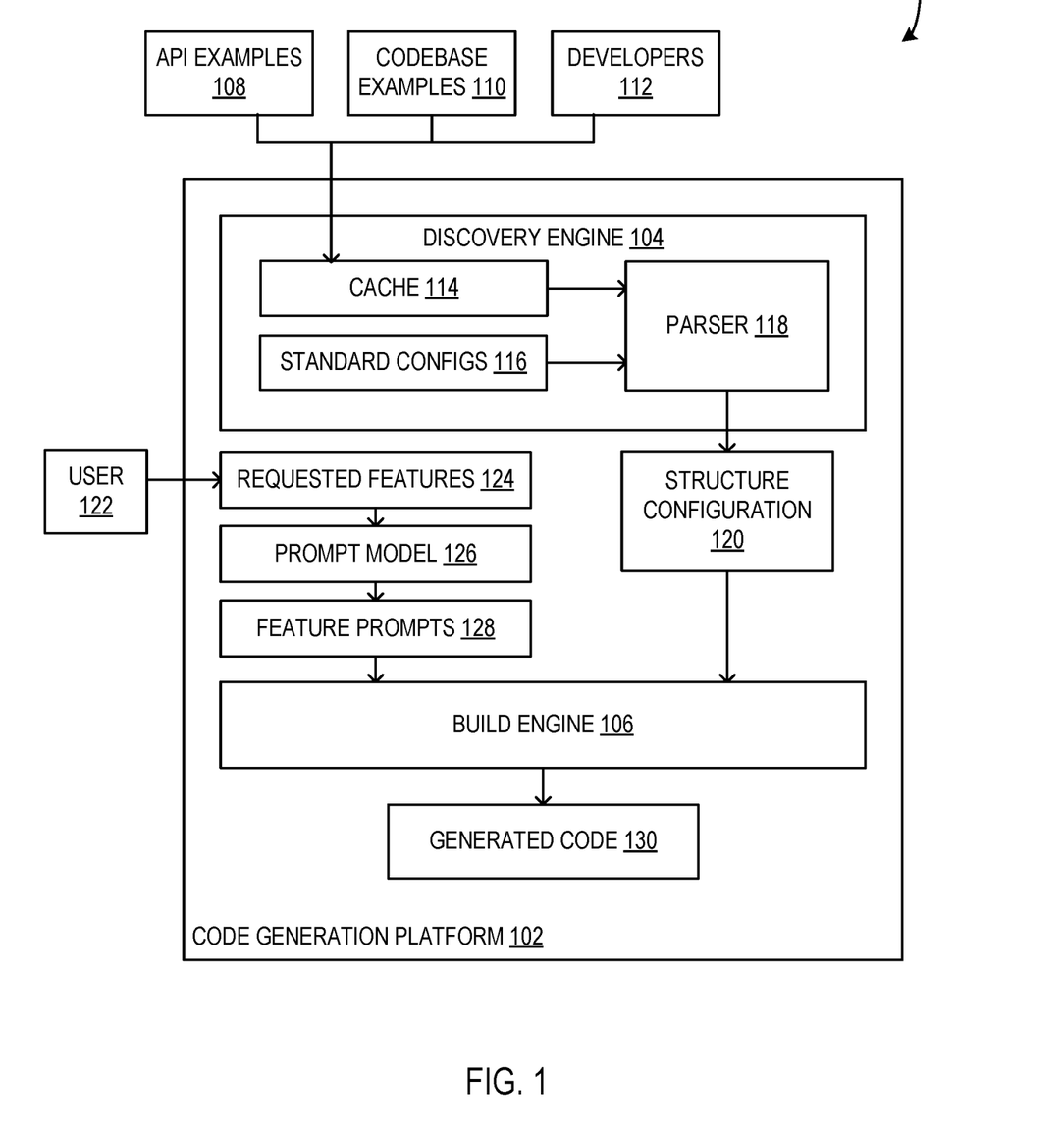
FIG. 1 is a block diagram illustrating an example system configured to generate code based on requested features.

FIG. 1 is a block diagram illustrating an example system 100 configured to generate code 130 based on requested features 124. In some examples, the system 100 includes a code generation platform 102 that is configured to receive code examples including application programming interface (API) examples 108 and codebase examples 110, as well as manually provided examples and/or configuration from developers 112 and, using those received code examples, to generate a structure configuration 120 using a discovery engine 104. Further, the system receives requested features 124 from a user 122 or other entity and generates feature prompts 128 from those requested features 124. A build engine 106 of the code generation platform 102 uses the feature prompts 128 and structure configuration 120 to generate code 130 as described herein. In some such examples, the generated code 130 is deployed or otherwise provided for review, testing, and/or use in a production setting.

Further, in some examples, the system 100 includes one or more computing devices (e.g., the computing apparatus of FIG. 6) that are configured to communicate with each other via one or more communication networks (e.g., an intranet, the Internet, a cellular network, other wireless network, other wired network, or the like). In some examples, entities of the system 100 are configured to be distributed between the multiple computing devices and to communicate with each other via network connections. For example, the discovery engine 104 is executed on a first computing device and the build engine 106 is located on a second computing device within the system 100. The first computing device and second computing device are configured to communicate with each other via network connections. Alternatively, in some examples, other components of the code generation platform 102 (e.g., the prompt model 126 is executed on a separate computing device from the rest of the code generation platform 102) are executed on separate computing devices and those separate computing devices are configured to communicate with each other via network connections during the operation of the code generation platform 102. In other examples, other organizations of computing devices are used to implement system 100 without departing from the description.

The discovery engine 104 includes hardware, firmware, and/or software configured to analyze and parse code examples, requirements, and/or parameters from a codebase and a set of standard configurations 116 to generate a structure configuration 120 which includes a plurality of code templates and/or patterns that share similar patterns to those found in the analyzed code examples. For instance, in an example, the discovery engine 104 is provided a set of code examples from the codebase of a company. The discovery engine 104 generates a structure configuration 120 that includes code templates that conform to patterns of the codebase of the company.

In some examples, the discovery engine 104 is configured to obtain API examples 108 and codebase examples 110 from a codebase and to store those received examples in a cache 114. The API examples 108 and the codebase examples 110 are examples of code from the codebase for which the generated code 130 will be generated. A codebase and associated APIs used by an entity include common patterns and structures and the code generation platform 102 is configured to use the discovery engine 104 to identify those common patterns and structures and to use the identified common patterns and structures in code 130 generated in association with the analyzed codebase. In some such examples, the codebase examples 110 include a plurality of code files that include code for a plurality of components. Such components include graphical user interface (GUI) components (e.g., web pages, application windows, or the like), components that perform processes such as scripts, and/or other components that are used to provide a user experience (UX). API examples 108 include API code that is used to enable applications, processes, and/or other entities of the codebase to interact with each other and/or with entities outside of the codebase. In some examples, the API examples 108 include a variety of types of APIs, such as Representational State Transfer (REST), Simple Object Access Protocol (SOAP), and/or Remote Procedure Call (RPC) APIs, or event APIs from external API providers (e.g., APIs that are available in the public domain). In combination, the API examples 108 and codebase examples 110 provide a comprehensive picture of how code is written and used with respect to the entity that owns or otherwise manages the codebase.

Further, in some examples, developers 112 associated with the codebase provide details about the codebase to guide the analysis of the discovery engine 104. For instance, in an example, a developer 112 provides a set of code format or structure requirements that explicitly must be used by the code generation platform 102 (e.g., code that is required for compliance with regulations). Additionally, or alternatively, in some examples, developers 112 define explicit limits regarding how components and/or APIs in the API examples 108 and codebase examples 110 can be used in generated code. In other examples, developers 112 provide other types of manual input to the discovery engine 104 without departing from the description.

In addition to the data stored in the cache 114, the discovery engine uses standard configurations 116. In some examples, a standard configuration 116 includes a plurality of standard code components (e.g., standardized UX components) and/or regular expressions that are generic and/or that can be used as building blocks for more complex components. While many codebases have large and varied quantities of components that are provided to the discovery engine 104 as codebase examples 110 or the like, in some such examples, some basic components or patterns of components are not present in the codebase examples 110 for analysis. Further, in some examples, the standard configurations 116 are used as the basic components upon which the components in the codebase examples 110 and/or API examples 108 are built (e.g., code of a web page in the codebase examples 110 includes and/or uses a base class and/or basic components, such as buttons and tables, from the standard configurations 116).

The parser 118 includes hardware, firmware, and/or software configured to analyze, scan, or otherwise read the code and/or other associated information from the cache 114 and standard configurations 116 and to generate a structure configuration 120. In some examples, the parser 118 begins by reading a component from the cache 114. The parser 118 adds the component to the structure configuration 120 if it is not already present and then identifies any components that are included in the component. Each of those components is then read and may be added to the structure configuration 120 if they are not already present. In this way, the parser 118 iterates through the code in the cache 114 and associated standard configurations 116 to build out the structure configuration 120. In some examples, the parser 118 parses the overall structure of the code in the cache 114 and standard configurations 116 as a tree data structure, such that complex components branch toward more basic components that are included therein. The parser 118 process is described in greater detail below.

The structure configuration 120 is a data structure that stores component code of the codebase in an organized manner that enables the code to be accessed and reused by the build engine 106. In some examples, the body of each code component is stored in the structure configuration 120 one time and, if that code component is referenced by more than one other code components, those references in the structure configuration 120 each reference or point to the single instance of the code component. Thus, in examples where the structure configuration 120 includes a tree structure of code components, the tree structure is populated with code component references that refer to the single instances of each code component.

Additionally, or alternatively, in some examples, each code component in the structure configuration 120 is associated with a component name and/or other component labels. Component names and/or labels are defined to provide information or context about the code component and/or what the code component does. For instance, in an example, a code component that is a checkout page for completing a transaction via an associated website is named or labeled "Checkout Page" or something similar. Such names or labels are used by the build engine as described below when generating the code 130. In other examples, other labels of code components are added, such as words that are similar to the name of the code component or other words that provide context about the purpose of the code component.

It should be understood that, in some examples, the code components in the structure configuration 120 include complex, unique components, such as a main website of the entity; components that are used as building blocks of the more complex components, such as a "terms and conditions" page that is shown at different times or stages or a media player component that can be embedded in a variety of other webpages; and/or very basic components such as a basic button user interface (UI) component. As a result of the analysis done by the parser 118 using the code in the cache 114 and standard configurations 116, the code components in the structure configuration 120 conform to the patterns of the codebase, including conforming with theme, appearance, and/or layout patterns.

In some examples, a user 122 or other entity provides the code generation platform 102 with requested features 124 for the code 130 to be generated. In some examples, the requested features 124 are in plain language that is typed, spoken, or otherwise provided by a user. Alternatively, or additionally, the requested features 124 include specific code requirements that are provided by an expert such as a developer 112, requested features 124 that are provided by a software application or other entity, or the like.

The build engine 106 includes hardware, firmware, and/or software that is configured to use the data from the requested features 124 with the structure configuration 120 to generate code 130 that exhibits the requested features 124. In some examples, the data of the requested features 124 is extracted or otherwise obtained from the requested features 124 using a prompt model 126, which generates feature prompts 128. The feature prompts 128 are then used by the build engine 106 to generate the code 130 from the code components in the structure configuration 120. The process by which the build engine 106 generates the generated code 130 is described in greater detail below.

In some examples, the prompt model 126 is a machine learning (ML) model such as a language model or multimodal model (e.g., a model that is configured to receive data in multiple modalities as input, where a modality is a mode or way in which information is expressed in the input, such as text data of a language modality, image data of a vision modality; and/or speech or sound of an audio modality). The prompt model 126 is trained to receive requested features 124 and to translate those requested features 124 into feature prompts 128. Further, in some examples, the prompt model 126 is fine-tuned using the structure configuration 120, such that the feature prompts 128 generated by the prompt model 126 are highly likely to accurately map to one or more code components in the structure configuration 120.

For instance, in an example, a requested feature 124 from a user 122 includes a request for "a window where a customer can complete their purchase". The prompt model 126 is trained to take that plain language as input and the map that input to the most relevant feature prompts 128. In this example, the feature prompt 128 generated by the prompt model 126 is "Checkout Page". In other examples, the user 122 provides a longer set of multiple requested features 124 and the prompt model 126 generates the most relevant feature prompts 128 for each of the requested features 124.

Further, in some examples, a requested feature 124 is used to generate two or more feature prompts 128. If the language of a requested feature 124 is complex, the prompt model 126 is trained to identify individual features in the language and to generate feature prompts 128 for those features to accurately represent the requested feature 124.

In some examples, prompt model 126 is a trained language model or multimodal model that is trained to semantically classify input. This trained model is then fine-tuned using the structure configuration 120 and/or the codebase upon which the structure configuration 120 is based. For instance, in an example, training data input to the prompt model 126 includes training data pairs of feature prompts associated with code components in the structure configuration 120 paired with plain language descriptions of those code components. The prompt model 126 is provided with a plain language description and the prompt model 126 generates an output feature prompt or prompts 128. This output is compared to the feature prompt that is paired with the plain language description and, if they differ, the prompt model 126 is adjusted to improve accuracy of similar classifications in the future. In other examples, the prompt model 126 is trained to generate feature prompts 128 from requested features 124 using other methods without departing from the description.

In some examples, the build engine 106 uses the feature prompts 128 to identify code components in the structure configuration 120 to include in the generated code 130. For instance, in an example where the feature prompts 128 include a prompt for a web page that displays a list of search results, the build engine 106 identifies an existing code component for a result list display web page and includes at least a portion of that code component in the generated code 130. Further, in some examples, a code component that is identified based on a feature prompt 128 is a complex component that includes one or more other more basic code components. In such examples, the build engine 106 identifies the code sub-components in the structure configuration 120 that are part of or otherwise associated with the complex component and includes the identified sub-components in the generated code. For instance, in an example where a complex code component that includes a plurality of button components is generated as part of the generated code 130, the build engine 106 uses the component references in the structure configuration 120 to also include the plurality of button components in the generated code 130 with the more complex code component.

Additionally, or alternatively, in some examples, a code component generated by the build engine 106 as part of the generated code 130 includes one or more API links to one or more other components in the structure configuration 120. The build engine 106 identifies the API links to other components in the structure configuration 120 and also generates those other components in the generated code 130. For instance, in an example where the generated code 130 includes a web page code component that is configured to link to a series of other web pages, the build engine 106 also generates those other web pages as part of the generated code 130 to ensure that the series of web pages in the generated code 130 are complete. Further, in examples where a code component or components generated for the generated code 130 have branching API paths to different components, the build engine 106 iterates through the possible branching paths and generates the components necessary to complete all the possible branching paths in the generated code 130.

In some examples, the feature prompts 128 include prompts associated with combinations of components and API calls. For instance, in an example, a feature prompt 128 calls for a button component that opens a specific GUI component when activated. The build engine 106 is configured to identify a generic button component in the structure configuration 120 and to generate code for the requested button using the code of the generic button component and inserting code to call an API associated with the specific GUI component or otherwise open the specific GUI component. Thus, while a button component that opens that specific GUI component is not present in the structure configuration 120, the build engine 106 is configured to use the data therein associated with button components and with APIs that open or activate other code components to generate a new, specific button component that opens the specific GUI component.

The generated code 130 includes a combination of code components that is generated automatically by the build engine 106 and that is executable upon completion of the generation process. Further, the generated code 130 includes a combination of code components that provide the requested features 124 within a degree of accuracy. However, in some examples, the feature prompts 128 are not accurately and/or completely translated into the generated code 130 (e.g., the accuracy of the translation from requested features 124 to feature prompts 128 was limited by the current capabilities of the prompt model 126). In such examples, the generated code 130 includes code components that are as complete as possible and a report, notification, and/or other indication to a user regarding the portions of the generated code 130 that may not be accurate or complete.

In some examples, the generated code 130 is checked in and/or deployed to an environment where it can be executed. For instance, in an example, the code generation platform 102 is configured to deploy generated code 130 to a test domain automatically, such that a user 122 is enabled to evaluate the functionality of the generated code 130 and determine whether it is accurate and/or complete. Additionally, or alternatively, the generated code 130) and/or a notification associated therewith is provided to the requesting user 122 by the code generation platform 102 (e.g., providing an interface by which the generated code 130 can be viewed, sending code files of the generated code 130 to the user 122's email address or other contact, or the like).

Further, in some examples, the discovery engine 104 is configured to generate and/or update the structure configuration 120 periodically and/or based on the occurrence of events. For instance, in an example, the discovery engine 104 is configured to obtain up-to-date API examples 108 and/or codebase examples 110 in cache 114 once a week. Then, the discovery engine 104 uses the up-to-date data in the cache 114 to generate an updated structure configuration 120. Alternatively, or additionally, the discovery engine 104 is configured to obtain and/or receive updates associated with changes to the codebase and, upon receiving or otherwise determining that a change was made to the codebase, the discovery engine 104 obtains any updated API and codebase examples 108 and 110 and generates an updated structure configuration 120 as described herein.

Additionally, it should be understood that, in some examples, the build engine 106 is used to generate code 130 multiple times for a variety of different requested features 124 after the discovery engine 104 has generated the structure configuration 120. In some such examples, the operations of the discovery engine 104 and build engine 106 can be performed independently and in parallel, such that a user 122 can use the build engine 106 to generate code 130 from requested features 124 using a current structure configuration 120 while the discovery engine 104 is operating to generate a new version of the structure configuration 120.

Further, in some examples, the generated code 130 is added to the codebase upon completion and/or confirmation by entities that manage the codebase. The generated code 130 is then later obtained by the discovery engine 104 as part of the API examples 108 and codebase examples 110 and, as a result, the generated code 130 is included in a later structure configuration 120. Thus, the code generation platform 102 is configured to dynamically grow the codebase with automatically generated code 130, providing users with increasing diversity of options to use when generating new code.

Figure 2:
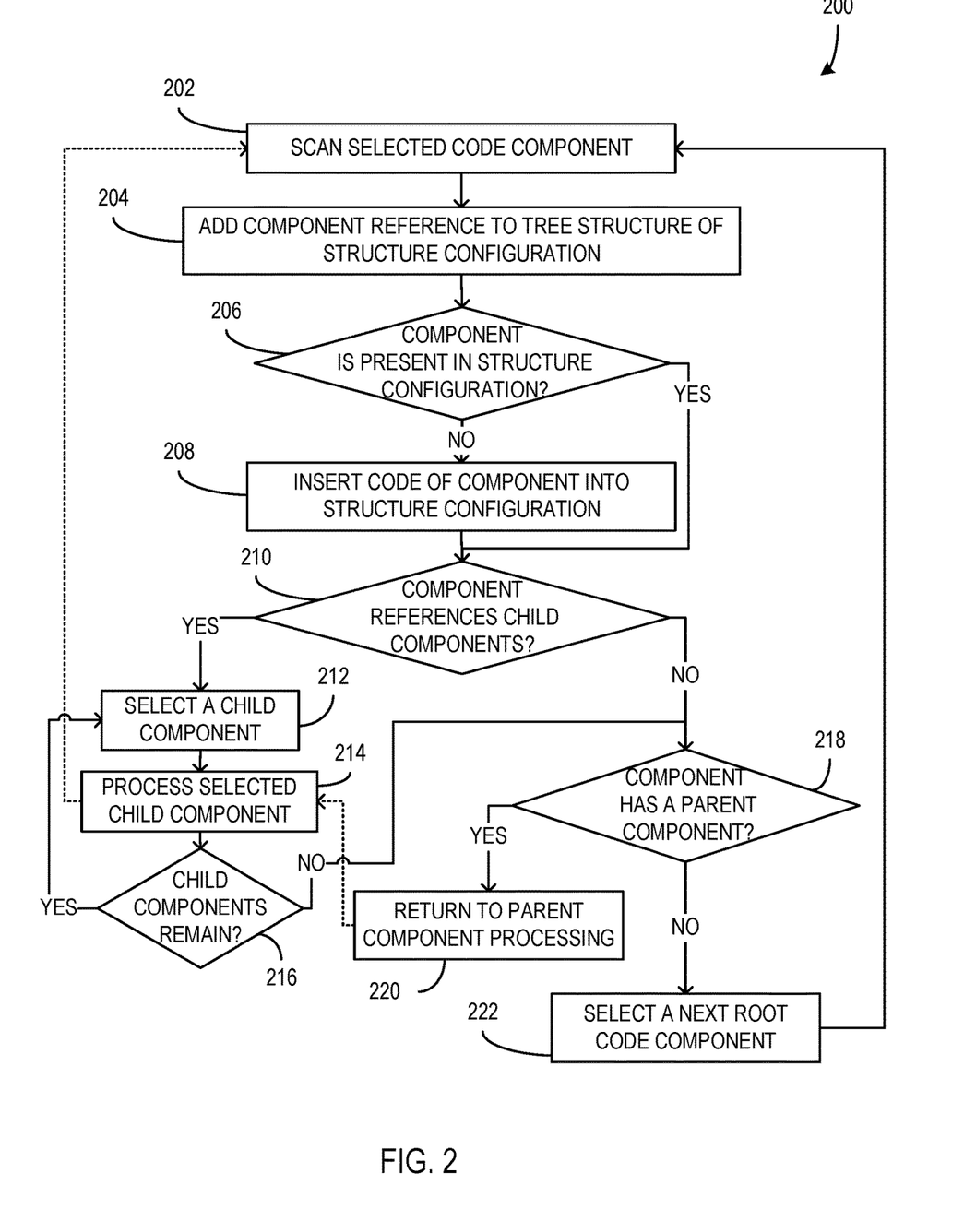
FIG. 2 is a flowchart illustrating an example method of a discovery engine for generating a structure configuration using code examples and standard configurations.

FIG. 2 is a flowchart illustrating an example method 200 of a discovery engine (e.g., discovery engine 104) for generating a structure configuration using code examples and standard configurations. In some examples, the method 200 is performed in a system such as system 100 of FIG. 1. Further, in some examples, the selected code components and associated child code components are UI code components that form complex UIs associated with the codebase (e.g., a large window UI code component includes many child UI code components in the form of buttons, text displays, image displays, table displays or the like). Additionally, or alternatively, the code components include API code components that are associated with UI code components or independent from UI code components. In other examples, the code components include other types of code components without departing from the description.

At 202, a selected code component is scanned. In some examples, the method 200 is initiated by selecting a main code component or root code component of the codebase examples 110 and/or API examples 108 provided to the discovery engine 104. Further, in some examples, scanning the selected code component includes reading the code of the code component, including identifying information of the code component, code that makes up one or more functions of the code component, code that references other code components, code that represents API calls to other code components, or the like. Additionally, or alternatively, the scanning of the code component includes generating a data value that can be used to compare the code component to other code components that have already been added to the structure configuration, such as a hash value or the like.

At 204, a component reference of the selected code component is added to the tree structure of the structure configuration. In some examples, adding the component reference includes adding a link between the component reference and any parent code component of the selected code component within the tree structure.

At 206, if the code component is present in the structure configuration, the process proceeds to 210. Alternatively, if the code component is not present in the structure configuration yet, the process proceeds to 208. In some examples, determining whether a code component is present in the structure configuration includes comparing data of the code component with corresponding data of code components in the structure configuration, such as comparing names of code components or comparing hash values of code components.

At 208, the code of the selected code component is added to the structure configuration. In some examples, the added code is indexed or otherwise referenced by a name or other identifier of the selected code component, enabling the code to be accessed using the name or other identifier in the structure configuration.

At 210, if the selected code component references child components, the process proceeds to 212. Alternatively, if the selected code component does not reference any child components, the process proceeds to 218.

At 212, a child component of the selected code component is selected and, at 214, the selected child component is processed. In some examples, processing the selected child component includes performing the method 200 as described herein where the selected code component is the selected child component, as illustrated by the dotted arrow from 214 to 202.

At 216, if child components remain, the process returns to 212 to select another child component. Alternatively, if no child components remain for processing, the process proceeds to 218.

At 218, if the selected code component has a parent component, the process proceeds to 220. Alternatively, if the selected code component does not have a parent component and/or is a root component, the process proceeds to 222.

At 220, the process returns to the parent component processing of the parent component of the selected code component. In some examples, returning to the parent component processing includes returning to 214 of a method 200 performed on the parent component of the selected code component, as illustrated by the dotted arrow from 220 to 214.

At 222, a new root code component is selected from the provided codebase examples and/or API examples and the process returns to 202 to scan the newly selected code component.

It should be understood that, in some examples, the method 200 traverses the structures of referenced code components to capture a tree structure of the components in which parent code components branch out to multiple child code components, then may branch out to more child components. Thus, a tree structure of code components is recorded in the structure configuration as described herein. Further, the code of code components is added to the structure configuration once and indexed or mapped by identifying data of the code components such that references to code components in the recorded tree structure can be used to access the code of those code components without the structure configuration recording redundant code of code components that appear in the tree structure multiple times.

Figure 3:
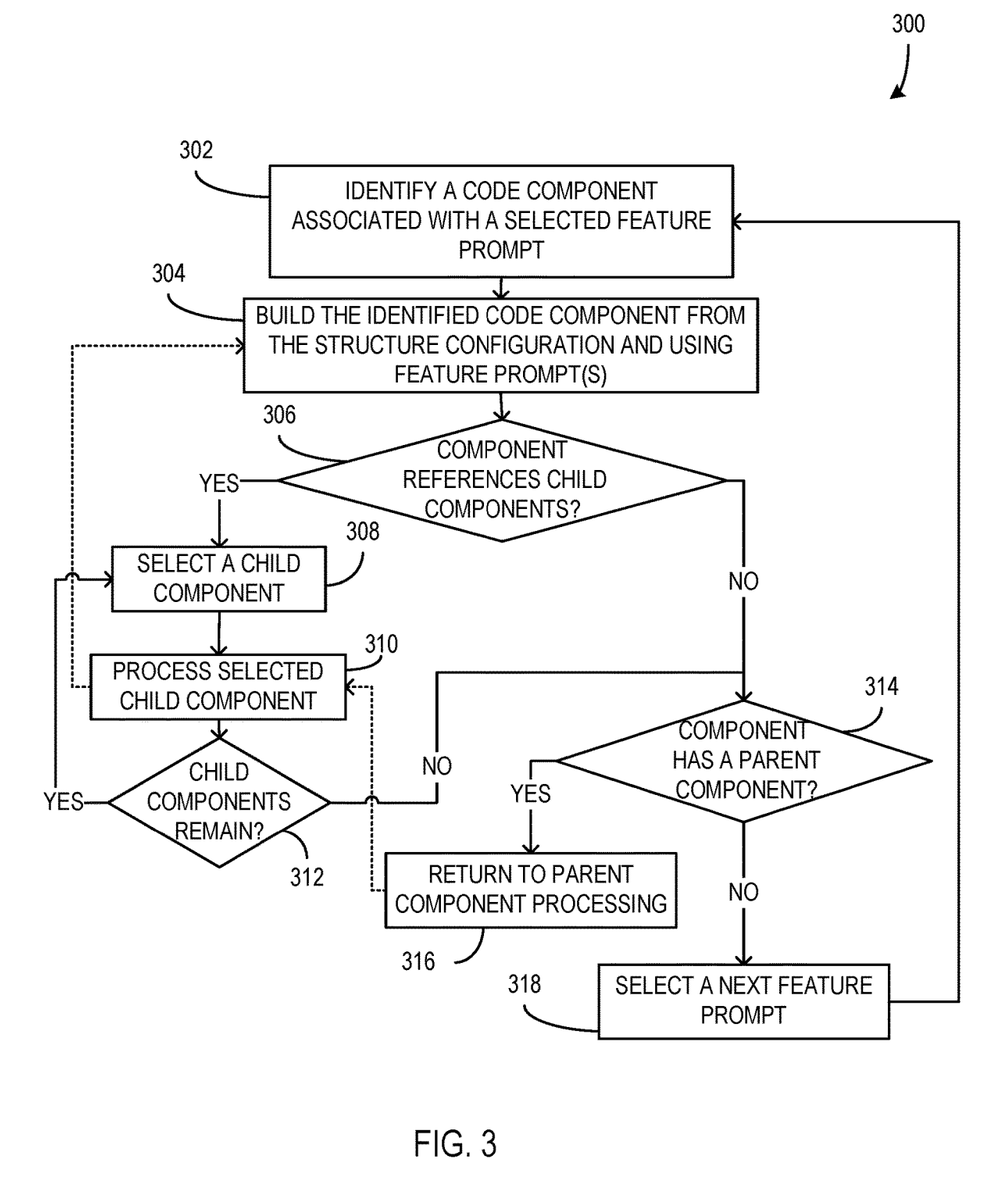
FIG. 3 is a flowchart illustrating an example method of a build engine for generating code using a structure configuration and feature prompts.

FIG. 3 is a flowchart illustrating an example method 300 of a build engine (e.g., build engine 106) for generating code using a structure configuration and feature prompts. In some examples, the method 300 is performed in a system such as system 100 of FIG. 1.

At 302, a code component associated with a selected feature prompt is identified. In some examples, identifying the code component includes comparing the selected feature prompt with a name or other identifying information of the code components in the structure configuration. Further, in some examples, each component is tagged with or otherwise assigned attributes and/or labels associated with the functionality of the component. The attributes and/or labels are derived from code variable names, comments in the code, and/or using a language model or multi-modal model analysis of the component code. When identifying a code component associated with the selected feature prompt, the tagged attributes and/or labels of the code components are compared to the selected feature prompt to determine a match, wherein a match is found based on the component labels and the feature prompt being semantically similar.

At 304, the identified code component is built from the structure configuration using the feature prompt(s). In some examples, building the code component includes accessing the code of the code component from the structure configuration and inserting the code in a file of the generated code 130. Additionally, in some examples, building the code component includes changing, altering, or otherwise customizing parameters, references to other code components or APIs, or the like, to be compatible with other code components that are present in the generated code 130 or that will be added to the generated code 130 during the described process. Further, in some examples, one or more feature prompts are used during the building of the code component to determine how to customize elements of the code component, such as the component name and/or other types of components that are referenced within the code component.

At 306, if the code component references child components or otherwise makes calls to other code components and/or APIs, the process proceeds to 308. Alternatively, if the code component does not reference any child components or make calls to other code components and/or APIs, the process proceeds to 314.

At 308, a child component of the identified code component is selected. It should be understood that, in some examples, the child component selected is another code component referenced in the code of the identified code component and/or an API that is called in the code of the identified code component.

At 310, the selected child component is processed. In some examples, processing the selected child component includes performing method 300 starting at 304 wherein the selected child component is used as the identified code component, as illustrated by the dotted arrow linking 310 to 304. Thus, the method 300 is configured to traverse multiple levels of code components to automatically build out complex groups of code components in response to feature prompts.

At 312, if child components remain, the process returns to 308 to select another child component of the identified code component. Alternatively, if no child components remain, the process proceeds to 314.

At 314, if the identified code component has a parent component (e.g., another code component refers to the current component and that component is the source of the method 300 being initiated with respect to the current component), the process proceeds to 316. Alternatively, if the identified code component does not have a parent component, the process proceeds to 318.

At 316, the process returns to the parent component processing. In some examples, returning to the parent component processing includes returning to 310 of a method 300 being performed with respect to the parent component, as illustrated by the dotted arrow from 316 to 310.

At 318, a next feature prompt is selected, and the process returns to 302 to identify another code component associated with the newly selected feature prompt. In some examples, the method 300 iterates through all feature prompts that are provided to generate multiple code components as described herein, wherein in the result is a complex set of interconnected code components that make up an automatically generated computer application, web page, or the like.

Figure 4:
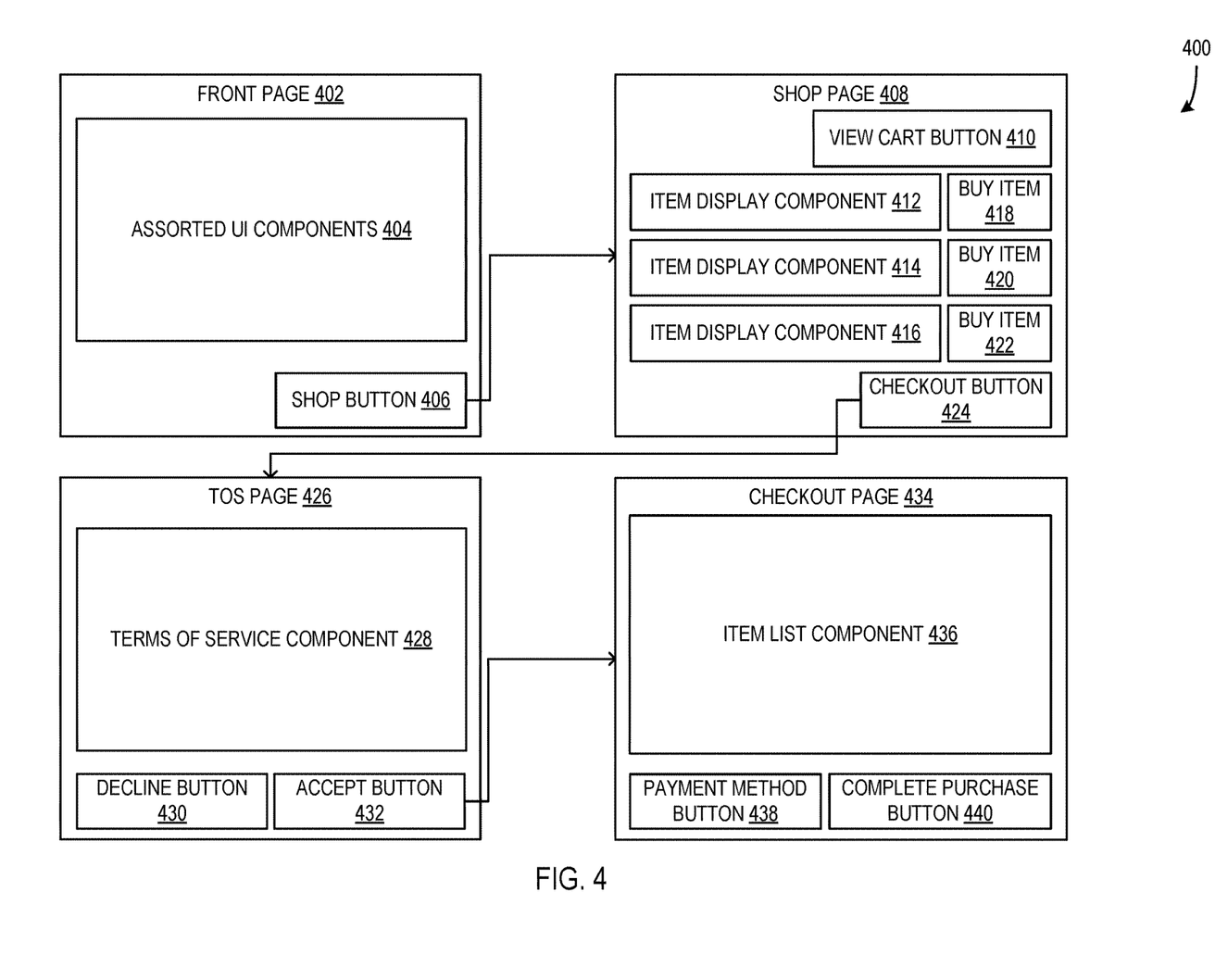
FIG. 4 is a diagram illustrating example user interfaces (UIs) generated based on requested features.

FIG. 4 is a diagram 400 illustrating example user interfaces (UIs) (e.g., the front page 402, the shop page 408, the terms of service (TOS) page 426, and the checkout page 434) generated based on requested features. In some examples, the example UIs are generated by a system such as system 100 of FIG. 1 and/or using processes such as methods 200 and 300 of FIGS. 2 and 3, respectively.

In some examples, the UIs 402, 408, 426, and 434 are generated as a result of a request for a multi-page website that enables users to shop for and purchase some purchasable items, including a checkout page for completing purchases. The front page 402 is generated to include some assorted UI components 404 which are based on features mentioned in the request and/or based on common UI component patterns that are present in the structure configuration (e.g., structure configuration 120) of the codebase. Further, to address the request for an interface that enables users to shop for and purchase items, the shop button 406 is generated and included in the code of the front page 402. In some such examples, the shop button 406 is a simple UI code component for which text can be generated (e.g., "Go to shop" or "Start shopping!"). Further, shop button 406 includes code that enables it to be activated by a user, such as by selecting the shop button 406 or clicking on the shop button 406 with a pointer using a mouse or other similar interface. The shop button 406 includes code that calls an API or otherwise causes code to be executed that displays the shop page 408.

In some examples, the shop page 408 is a UI code component with several child UI code components as described herein. The shop page 408 includes code that defines how the shop page 408 is displayed and where and how its child UI code components are displayed within the shop page 408. For instance, the shop page 408 includes a view cart button 410 as a child UI component. In some examples, when activated, the view cart button 410 causes another page to be displayed that includes the items currently in the user's virtual cart. Additionally, the shop page 408 includes a series of item display components 412, 414, and 416 and associated buy item buttons 418, 420, and 422. A user of the shop page 408 is enabled to view the items for sale in the item display components 412-416 and to add some or all of those displayed items to a virtual shopping cart using the associated buy item buttons 418-422.

In some such examples, the shop page 408 is generated iteratively by selecting a shop page UI code component from the structure configuration and generating code associated with that selected shop page UI code component. During the generation of that code, each child UI code component associated with the shop page is identified and code for each of the identified child UI code components is generated. Thus, the shop page 408 is generated in such a way that it conforms to patterns established by other similar shop pages that are present in the codebase.

Further, the shop page 408 includes a checkout button 424, which is a child UI code component of the shop page 408. The checkout button 424 is generated to display text such as "Checkout" and to enable a user to activate it. When activated, the checkout button 424 is configured to trigger an API call that performs the checkout process. However, rather than causing the checkout page 434 to be immediately displayed, the structure configuration includes business requirement or compliance patterns that are automatically included in the generated processes. As illustrated, a TOS page 426 is generated and configured to be displayed as a result of the checkout button 424 being activated.

The TOS page 426 includes a terms of service component 428 that displays the terms of service that customers are required to accept before completing a purchase. In some examples, a TOS page 426 and associated terms of service component 428 are present in the structure configuration, as well as associated API code components that cause those pages and/or components to be displayed. Thus, in some such examples, the original request from the user does not explicitly need to request the TOS page 426 be included for the systems and/or methods described herein to automatically generate such a TOS page 426 or other required business or compliance components. Because the patterns that are present in the structure configuration include a TOS page that must be accepted prior to the display of a checkout page, the TOS page 426 is automatically generated and configured to be displayed prior to the checkout page 434.

The TOS page 426 includes a decline button 430 and an accept button 432. These are both child UI code components that can be activated. If the decline button 430 is activated, the user has declined to accept the terms of service and the purchase cannot be completed. In some examples, the result of activating the decline button 430 is returning to the shop page 408 or the display of an explanation as to why the purchase cannot be completed. Alternatively, if the accept button 432 is activated, the checkout page 434 is caused to be displayed.

As with the other pages of FIG. 4, checkout page 434 includes child UI code components, including an item list component 436, a payment method button 438, and a complete purchase button 440. In some examples, the item list component 436 is configured to be populated with the items that are in the current virtual shopping cart (e.g., those items that the user added to the shopping cart using the buy item buttons 418-422). The payment method button 438 is configured to enable the user to enter information about and/or choose a payment method for the upcoming purchase. For instance, in an example, another page is displayed that enables the user to select a previously entered payment method and/or to enter a set of required details about a new payment method. The complete purchase button 440 is configured to use the selected payment method to initiate the transaction for the purchase of the items listed in the item list component 436. In some examples, an API code component associated with the transaction initiation is generated in association with the complete purchase button 440, such that an API call of the API code component is triggered when the complete purchase button 440 is activated. The association of the complete purchase button 440 UI code component with the API code component is determined based on patterns that are present in the structure configuration as described herein.

Figure 5:
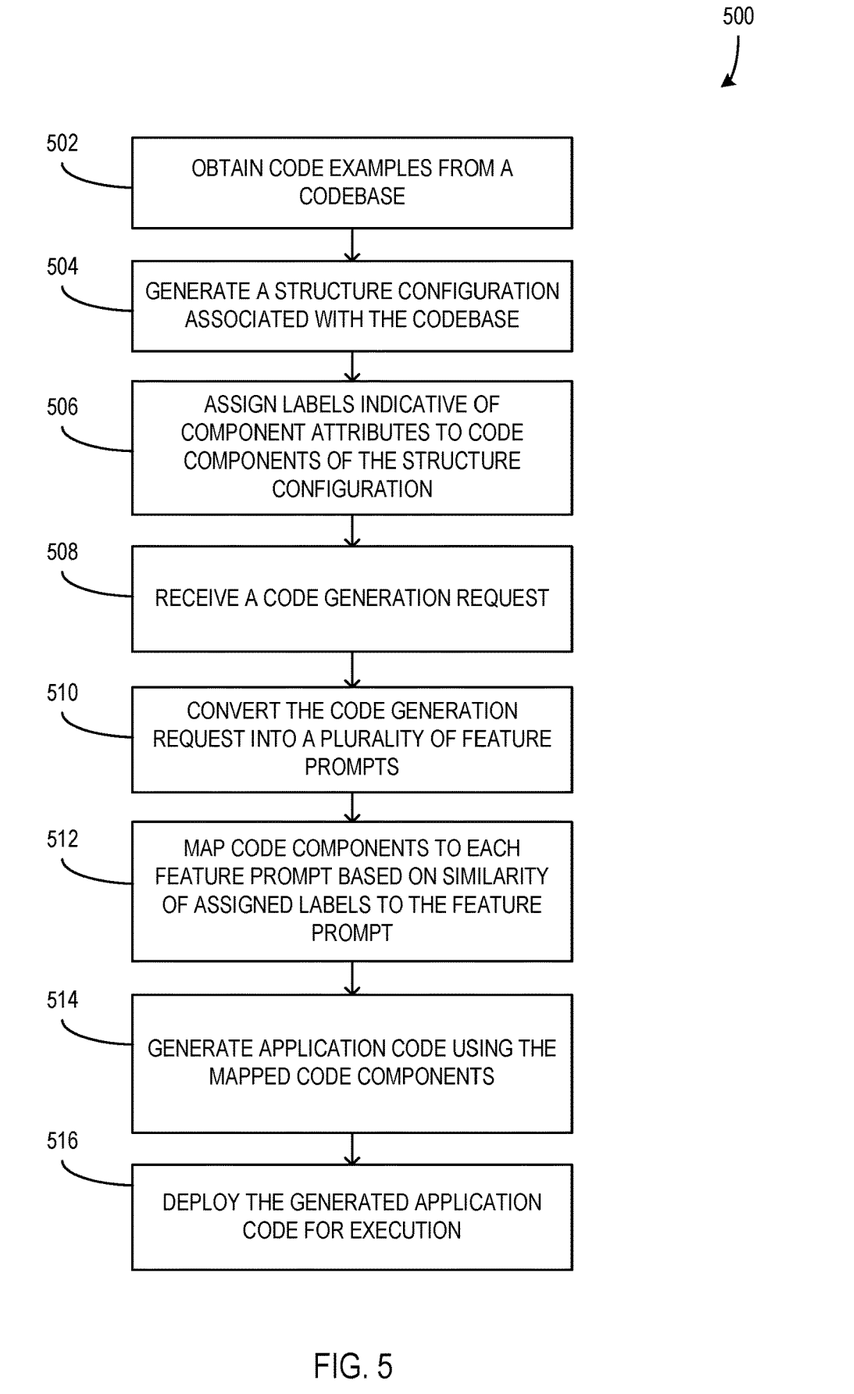
FIG. 5 is a flowchart illustrating an example method for generating a structure configuration of a codebase and generating application code using that structure configuration.

FIG. 5 is a flowchart illustrating an example method 500 for generating a structure configuration (e.g., structure configuration 120) of a codebase and generating application code (e.g., generated code 130) using that structure configuration. In some examples, the method 500 is performed in a system such as system 100 of FIG. 1. Further, in some examples, the method 500 includes methods such as methods 200 and 300 of FIGS. 2 and 3, respectively.

At 502, code examples are obtained from a codebase. In some examples, the code examples obtained include source code of UI code components used in the systems of the codebase and/or code of any APIs that are exposed by and/or used by those UI code components. For instance, in an example, the obtained code examples include API examples 108 and/or codebase examples 110. Additionally, or alternatively, in some examples, developers provide additional information associated with configurations, settings, and/or parameters associated with the codebase as described herein.

At 504, a structure configuration associated with the codebase is generated. In some examples, the structure configuration is generated based on API examples, codebase examples such as UI code examples, and/or a set of standard code components of one or more standard configurations 116. Further, in some examples, the generation of the structure configuration is performed by a discovery engine 104, which is configured to traverse the structure of the provided codebase examples to determine an overall structure of the codebase and generate the structure configuration to reflect that overall structure (e.g., references or links between code components are recorded in the structure configuration, such as parent-child relationships between UI code components). For instance, in an example, the discovery engine 104 performs the method 200 of FIG. 2 on the code components in the obtained code examples to generate the structure configuration. In some examples, the code components of the structure configuration include GUI components, API components, script code components, security code components, compliance code components, or the like.

At 506, labels that are indicative of component attributes are assigned to the code components of the structure configuration, including UI code components and API code components. In some examples, attributes of each code component in the structure configuration are identified and the code components are labeled with text labels and/or labels including other information, such as code values that map to attributes. In some such examples, the label information is extracted from the names of code components, function names within the code of the code components, information included in the comments of the code components or the like. Additionally, or alternatively, in some examples, the attributes and associated labels of code components are determined by using a model, such as a language model or multi-modal model, to analyze the code of the code components without departing from the description.

At 508, a code generation request is received. In some examples, the code generation request is received from a user in the form of text data or another modality, such as audio data of the user's voice. Alternatively, or additionally, data of the code generation request is received from another application or software entity, such as an entity that prompts a user to provide feature information for the code generation request or an entity that translates information provided by a user into another format.

At 510, the code generation request is converted into a plurality of feature prompts. In some examples, the conversion of the code generation request and/or generation of the plurality of feature prompts is performed by a multi-modal ML model that has been trained to generate feature prompts that are semantically similar to the language or other data provided in the code generation request, as described herein. Further, in some such examples, the plurality of feature prompts is drawn from a set or group of feature prompts that have been defined in such a way that they can be efficiently and accurately mapped to the assigned labels of code components within the structure configuration. In such examples, the trained ML model is fine-tuned using the code components and labels assigned thereto in the structure configuration after the structure configuration is generated, yielding an ML model that is specifically trained for use with the codebase for which the structure configuration was generated. Additionally, or alternatively, in some examples, the set of possible feature prompts and the set of possible labels assigned to code components are configured to overlap, such that the plurality of feature prompts that are generated from a code generation request can be precisely mapped to labels that have been assigned to code components in the structure configuration, as described herein.

At 512, code components are identified and mapped to each feature prompt of the plurality of feature prompts based on the semantic similarity of the feature prompt to labels assigned to the mapped code components. In some examples where the set of feature prompts overlaps with the set of assigned labels, a feature prompt is matched precisely with an assigned label and the code components to which that label has been assigned are identified. This group of code components is then narrowed down by comparing other feature prompts of the plurality of feature prompts to other labels assigned to the code components in the group of code components. The code components therein with high quantities of assigned labels that match feature prompts are likely to be the code components that should be included in the generated application code.

Alternatively, or additionally, the semantic similarity of a feature prompt to an assigned label of a code component is determined using a language model or multi-modal model.

In some such examples, the model is trained to provide a semantic similarity value associated with two or more inputted words or phrases, wherein the semantic similarity value is higher if the inputs are more semantically similar, and the semantic similarity value is lower if the inputs are less semantically similar. Thus, a feature prompt is analyzed in comparison to the labels assigned to the code components of the structure configuration and one or more code components that yield relatively high semantic similarity values are identified as likely being the code components that have been requested in the code generation request. In other examples, other methods of identifying code components that map to feature prompts are used without departing from the description.

At 514, application code is generated using the mapped code components. In some examples, the application code is generated by a build engine 106, wherein the build engine 106 is configured to perform method 300 of FIG. 3 using the plurality of feature prompts and the structure configuration as described herein. Further, in some examples, the generated application code includes code for displaying a UI code component from the structure configuration and code for calling an API of an API code component from the structure configuration. In some such examples, the displayed UI code component is configured to be activated and the calling of the API is triggered upon activation of the displayed UI code component (e.g., the checkout button 424 triggers the display of the TOS page 426 upon activation).

At 516, the generated application code is deployed for execution. In some examples, the generated application code is deployed to a test domain, enabling tests to be executed on the generated application code to confirm its stability and accuracy. Additionally, or alternatively, after the application code is generated, it is provided for review by one or more users or other software entities prior to being executed in a domain. In some such examples, the user that provided the code generation request is notified that the application code has been generated and prompted to review the code. The user is enabled to review the code, and, upon approving of the code, the user is enabled to deploy the code to a domain for execution. Further, in some examples, the user is enabled to make changes to the generated application code prior to deployment.

Exemplary Operating Environment

Figure 6:
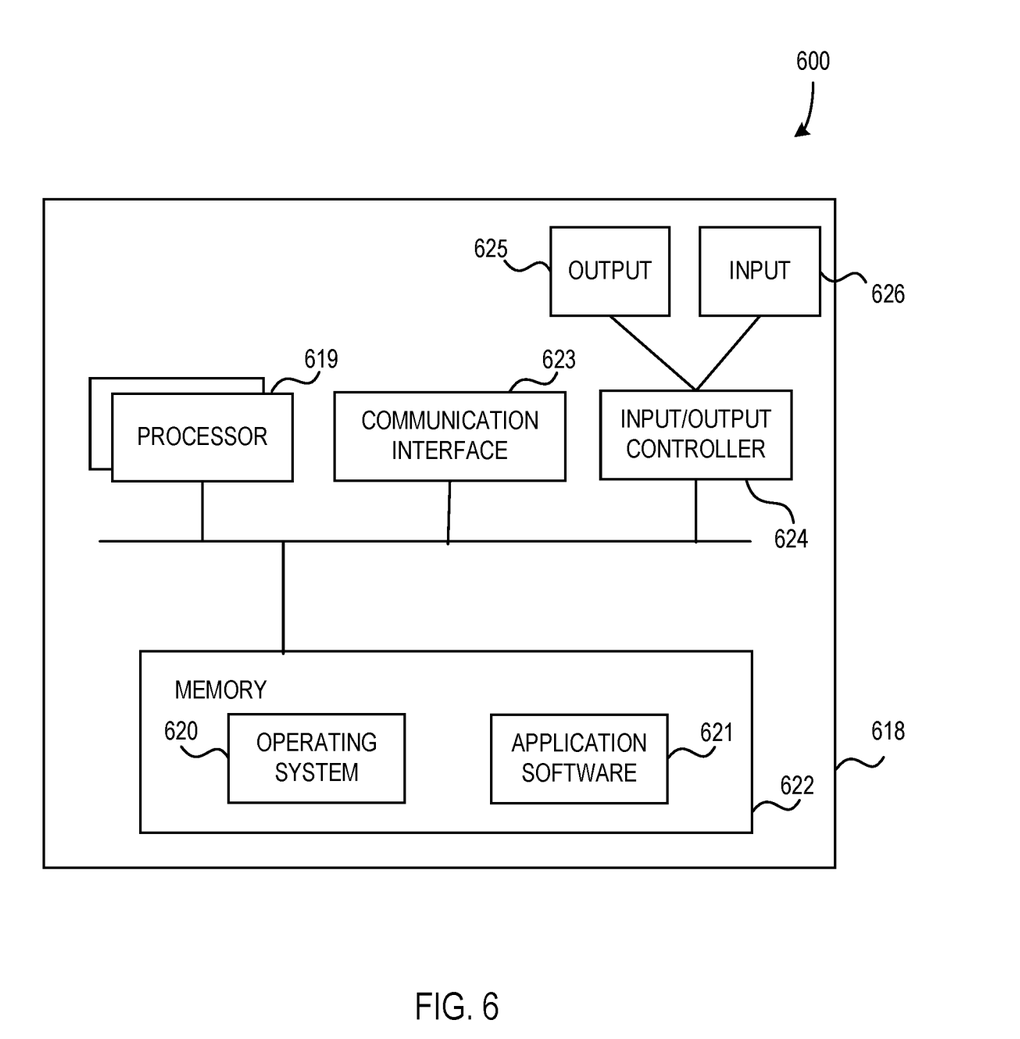
FIG. 6 illustrates an example computing apparatus as a functional block diagram.

The present disclosure is operable with a computing apparatus according to an embodiment as a functional block diagram 600 in FIG. 6. In an example, components of a computing apparatus 618 are implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. In some examples, platform software comprising an operating system 620 or any other suitable platform software is provided on the apparatus 618 to enable application software 621 to be executed on the device. In some examples, generating a structure configuration specific to a codebase and then generating application code using the structure configuration in response to a code generation request as described herein is accomplished by software, hardware, and/or firmware.

In some examples, computer executable instructions are provided using any computer-readable media that is accessible by the computing apparatus 618. Computer-readable media include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, Random Access Memory (RAM). Read-Only Memory (ROM). Erasable Programmable Read-Only Memory (EPROM). Electrically Erasable Programmable Read-Only Memory (EEPROM), persistent memory, phase change memory, flash memory or other memory technology. Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that, in some examples, the storage is distributed or located remotely and accessed via a network or other communication link (e.g., using a communication interface 623).

Further, in some examples, the computing apparatus 618 comprises an input/output controller 624 configured to output information to one or more output devices 625, for example a display or a speaker, which are separate from or integral to the electronic device. Additionally, or alternatively, the input/output controller 624 is configured to receive and process an input from one or more input devices 626, for example, a keyboard, a microphone, or a touchpad. In one example, the output device 625 also acts as the input device. An example of such a device is a touch sensitive display. The input/output controller 624 may also output data to devices other than the output device, e.g., a locally connected printing device. In some examples, a user provides input to the input device(s) 626 and/or receives output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises a processor; and a memory comprising computer program code, the memory and the computer program code configured to cause the processor to: obtain code examples from a codebase, the code examples including user interface (UI) component examples and application programming interface (API) usage examples; generate a structure configuration associated with the codebase using the obtained code examples and a standard configuration dataset, wherein the structure configuration includes at least UI code components specific to the UI component examples and API code components specific to the API usage examples; assign labels indicative of component attributes to the UI code components and the API code components in the structure configuration; receive a code generation request; convert the code generation request into a plurality of feature prompts; map at least one of the UI code components or the API code components in the structure configuration to each feature prompt of the plurality of feature prompts based on semantic similarity of the feature prompt to an assigned label of the mapped code component; generate application code using each of the mapped code components, wherein the application code includes first code for displaying a UI code component from the structure configuration and second code for calling an API of an API code component from the structure configuration; and deploy the generated application code for execution.

An example computerized method comprises obtaining code examples from a code data store of a codebase, the code examples including user interface (UI) component examples and application programming interface (API) usage examples; generating a structure configuration associated with the codebase using the obtained code examples and a standard configuration dataset, wherein the structure configuration includes at least UI code component specific to the UI component examples and API code components specific to the API usage examples, the generating including: recording code of each code component in the obtained code examples; and generating a tree structure indicating references between code components in the obtained code examples; assigning labels indicative of component attributes to the UI code components and the API code components in the structure configuration; receiving a code generation request; mapping at least one of the UI code components or the API code components in the structure configuration to the code generation request based on semantic similarity of portions of the code generation request to an assigned label of the mapped code component; generating application code using the mapped code components, wherein the application code includes first code for displaying a UI code component from the structure configuration and second code for calling an API of an API code component from the structure configuration; and deploying the generated application code for execution.

One or more computer storage media having computer-executable instructions that, upon execution by a processor, case the processor to at least: receive a code generation request associated with a codebase; convert the code generation request into a plurality of feature prompts; generate application code using the plurality of feature prompts and code components of a structure configuration associated with the codebase, the generating including: selecting a feature prompt of the plurality of feature prompts; determining a UI code component of the structure configuration based on semantic similarity of an assigned label of the determined UI code component to the selected feature prompt; generating first code of the determined UI code component in the generated application code using the structure configuration; determining an API code component associated with the determined UI code component based on semantic similarity of an assigned label of the determined API code component to the selected feature prompt; generating second code of the determined API code component in the generated application code using the structure configuration; and deploy the generated application code for execution.

Alternatively, or in addition to the other examples described herein, examples include any combination of the following:

wherein generating the structure configuration associated with the codebase includes generating a tree structure including links between a parent code component of the structure configuration and one or more child code components of the structure configuration that are referenced by code of the parent code component.

wherein generating the structure configuration associated with the codebase includes: selecting a code component of an obtained code example; adding a first reference to the selected code component to the tree structure of the structure configuration; determining that code of the selected code component is not present in the structure configuration; recording the code of the selected code component in the structure configuration; identifying a child code component to which the selected code component refers; adding a second reference to the identified child code component to the tree structure of the structure configuration; and linking the first reference to the selected code component in the tree structure to the second reference of the identified child code component in the tree structure.

wherein generating the application code using the plurality of feature prompts and the code components of the generated structure configuration includes: selecting a feature prompt from the plurality of feature prompts; determining a code component of the generated structure configuration associated with the selected feature prompt; generating code of the determined code component in the generated application code using the structure configuration; identifying a child code component to which the determined code component refers; and generating code of the identified child code component in the generated application code using the structure configuration.

wherein converting the code generation request into a plurality of feature prompts includes using a multi-modal machine learning (ML) model to generate the plurality of feature prompts using the code generation request as input.

wherein the code generation request includes one or more of text data or audio data describing requested application features.

wherein the code for displaying the UI code component includes code for enabling activation of the UI code component; and wherein the code for calling the API of the API code component is triggered based on activation of the UI code component.

wherein deploying the generated application code for execution includes at least one of the following: providing the generated application code for review prior to execution or deploying the generated application code to a test domain for testing.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining code examples from a codebase, the code examples including user interface (UI) component examples and application programming interface (API) usage examples; exemplary means for generating a structure configuration associated with the codebase using the obtained code examples and a standard configuration dataset, wherein the structure configuration includes at least UI code components specific to the UI component examples and API code components specific to the API usage examples; exemplary means for assigning labels indicative of component attributes to the UI code components and the API code components in the structure configuration; exemplary means for receiving a code generation request; exemplary means for converting the code generation request into a plurality of feature prompts; exemplary means for mapping at least one of the UI code components or the API code components in the structure configuration to each feature prompt of the plurality of feature prompts based on semantic similarity of the feature prompt to an assigned label of the mapped code component; exemplary means for generating application code using each of the mapped code components, wherein the application code includes first code for displaying a UI code component from the structure configuration and second code for calling an API of an API code component from the structure configuration; and exemplary means for deploying the generated application code for execution.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor; and
a memory comprising computer program code, the memory and the computer program code configured to cause the processor to:
obtain code examples from a codebase, the code examples including user interface (UI) component examples and application programming interface (API) usage examples;
generate a structure configuration associated with the codebase using the obtained code examples and a standard configuration dataset, wherein the structure configuration includes at least UI code components specific to the UI component examples and API code components specific to the API usage examples;
assign labels indicative of component attributes to the UI code components and the API code components in the structure configuration;
receive a code generation request;
convert the code generation request into a plurality of feature prompts;
map at least one of the UI code components or the API code components in the structure configuration to each feature prompt of the plurality of feature prompts based on semantic similarity of the feature prompt to an assigned label of the mapped code component;
generate application code using each of the mapped code components, wherein the application code includes first code for displaying a UI code component from the structure configuration and second code for calling an API of an API code component from the structure configuration; and
deploy the generated application code for execution.

2. The system of claim 1, wherein generating the structure configuration associated with the codebase includes generating a tree structure including links between a parent UI code component of the structure configuration and one or more child UI code components of the structure configuration that are referenced by code of the parent UI code component.

3. The system of claim 2, wherein generating the structure configuration associated with the codebase includes:
selecting a UI code component of an obtained UI code example;
adding a first reference to the selected UI code component to the tree structure of the structure configuration;
determining that code of the selected UI code component is not present in the structure configuration;
recording the code of the selected UI code component in the structure configuration;
identifying a child UI code component to which the selected UI code component refers;
adding a second reference to the identified UI child code component to the tree structure of the structure configuration; and
linking the first reference to the selected UI code component in the tree structure to the second reference of the identified UI child code component in the tree structure.

4. The system of claim 1, wherein generating application code using each of the mapped code components includes:
selecting a mapped code component from the mapped code components;
generating code of the selected code component in the generated application code using the structure configuration;
identifying a child code component to which the selected code component refers; and
generating code of the identified child code component in the generated application code using the structure configuration.

5. The system of claim 1, wherein converting the code generation request into the plurality of feature prompts includes using a multi-modal machine learning (ML) model to generate the plurality of feature prompts using the code generation request as input.

6. The system of claim 5, wherein the code generation request includes one or more of text data or audio data describing requested application features.

7. The system of claim 1, wherein the first code for displaying the UI code component includes code for enabling activation of the UI code component; and
wherein the second code for calling the API of the API code component is triggered based on activation of the UI code component.

8. The system of claim 1, wherein deploying the generated application code for execution includes at least one of the following: providing the generated application code for review prior to execution or deploying the generated application code to a test domain for testing.

9. A computerized method comprising:
obtaining code examples from a code data store of a codebase, the code examples including user interface (UI) component examples and application programming interface (API) usage examples;
generating a structure configuration associated with the codebase using the obtained code examples and a standard configuration dataset, wherein the structure configuration includes at least UI code component specific to the UI component examples and API code components specific to the API usage examples, the generating including:
recording code of each code component in the obtained code examples; and
generating a tree structure indicating references between code components in the obtained code examples;
assigning labels indicative of component attributes to the UI code components and the API code components in the structure configuration;
receiving a code generation request;
mapping at least one of the UI code components or the API code components in the structure configuration to the code generation request based on semantic similarity of portions of the code generation request to an assigned label of the mapped code component;
generating application code using each of the mapped code components, wherein the application code includes first code for displaying a UI code component from the structure configuration and second code for calling an API of an API code component from the structure configuration; and deploying the generated application code for execution.

10. The computerized method of claim 9, wherein generating the application code using each of the mapped code components includes:

selecting a mapped UI code component from the mapped code components;

generating code of the selected UI code component in the generated application code using the structure configuration;

identifying a child UI code component to which the selected UI code component refers; and generating code of the identified child UI code component in the generated application code using the structure configuration.

11. The computerized method of claim 9, wherein receiving the code generation request further includes converting the code generation request into a plurality of feature prompts using a multi-modal machine learning (ML) model using the code generation request as input.

12. The computerized method of claim 11, wherein the code generation request includes one or more of text data or audio data describing requested application features.

13. The computerized method of claim 9, wherein the first code for displaying the UI code component includes code for enabling activation of the UI code component; and wherein the second code for calling the API of the API code component is triggered based on activation of the UI code component.

14. The computerized method of claim 9, wherein deploying the generated application code for execution includes at least one of the following: providing the generated application code for review prior to execution or deploying the generated application code to a test domain for testing.

15. A computer storage medium has computer-executable instructions that, upon execution by a processor, cause the processor to at least:

receive a code generation request associated with a codebase;

convert the code generation request into a plurality of feature prompts;

generate application code using the plurality of feature prompts and code components of a structure configuration associated with the codebase, the generating including:

selecting a feature prompt of the plurality of feature prompts;

determining a UI code component of the structure configuration based on semantic similarity of the selected feature prompt to an assigned label of the determined UI code component;

generating first code of the determined UI code component in the generated application code using the structure configuration;

determining an API code component associated with the determined UI code component based on semantic similarity of the selected feature prompt to an assigned label of the determined API code component;

generating second code of the determined API code component in the generated application code using the structure configuration; and deploy the generated application code for execution.

16. The computer storage medium of claim 15, wherein generating the application code further includes:

identifying a child UI code component to which the determined UI code component refers; and generating third code of the identified child UI code component in the generated application code using the structure configuration.

17. The computer storage medium of claim 15, wherein converting the code generation request into the plurality of feature prompts includes using a multi-modal machine learning (ML) model to generate the plurality of feature prompts using the code generation request as input.

18. The computer storage medium of claim 17, wherein the code generation request includes one or more of text data or audio data describing requested application features.

19. The computer storage medium of claim 15, wherein the first code for the UI code component includes code for enabling activation of the UI code component; and wherein the second code for the API code component includes code for calling an API based on activation of the UI code component.

20. The computer storage medium of claim 15, wherein deploying the generated application code for execution includes at least one of the following: providing the generated application code for review prior to execution or deploying the generated application code to a test domain for testing.

* * * * *